United States Patent Office 2,904,532
Patented Sept. 15, 1959

2,904,532

LACQUER INCLUDING DIISOCYANATE AND POLYHYDROXY COMPOUNDS

Hugo Wilms, Leverkusen, Otto Bayer, Leverkusen-Bayerwerk, and Wilhelm Bunge, Leverkusen, Germany, assignors, by mesne assignments, to Mobay Chemical Company, Pittsburgh, Pa., a corporation of Delaware No Drawing. Application June 22, 1954
Serial No. 438,592

Claims priority, application Germany June 26, 1953

8 Claims. (Cl. 260—63)

The present invention relates to new plastics and to a process for their production.

It is known to produce lacquers, varnishes, impregnations, films and adhesives from polyhydroxy compounds and polyisocyanates, valuable cross-linked polyurethanes being formed.

Amongst the polyhydroxy compounds used in this known process, the easily accessible polyesters which contain varying proportions of hydroxyl groups, and are derived from dicarboxylic acids and polyalcohols have aroused especial technical interest.

The reaction products of these hydroxyl-group-containing polyesters with polyisocyanates have excellent mechanical and electrical properties. Moreover, they are highly resistant to swelling in most of the usual solvents and are very stable to dilute aqueous alkalies.

The present invention provides a process of producing plastics from polyhydroxy compounds and polyisocyanates, which comprises using as polyhydroxy compounds hydroxyl-group-containing conversion products of co-polymers derived from carbon monoxide and olefines.

Co-polymers of this kind are described in German Patent No. 863,711, in U.S. Patent No. 2,495,286, and in J. Am. Chem. Soc., 74, 1509 (1952).

The products obtained by the process of the present invention are highly resistant to alkalies, and are useful for preparing a wide variety of products, including lacquers, varnishes, adhesives, protective coatings and moulded objects.

Suitable starting materials for the process of the invention are co-polymers of carbon monoxide, and olefines such as ethylene, propylene or butylene. The properties of the plastics obtained can be varied by using a mixture of olefines and varying the composition of the mixture.

The co-polymers have a polyketone structure; they can be reduced by pressure hydrogenation in the presence of catalysts or by conventional reduction methods suitable for the production of secondary alcohols from ketones, for instance reduction according to Meerwein-Ponndorf with the aid of aluminum isopropylate.

Depending upon the ratio of carbon monoxide to olefin employed in the production of the co-polymer, the subsequent reduction leads to products with varying proportions of hydroxyl groups. Usually not all the carbonyl groups present in the co-polymer are converted to secondary hydroxyl groups; some of the carbonyl groups may be converted under the reaction conditions into 5-membered rings of tetrahydrofurane, cyclopentanone, or cyclopentanol type, as is known of $\gamma$-diketones, water being split off. Products containing said 5-membered rings incorporated in the polymer chain are particularly readily soluble in, and are readily compatible with, various other raw materials used in lacquers or varnishes, for instance polyesters containing hydroxyl groups, and, after the reaction with the polyisocyanates, yield cross-linked polyurethanes which are very stable to chemical influences, especially to alkalies.

If the same polyisocyanate is reacted with the various aforesaid reduced co-polymers, the polyurethanes obtained may have a high or low degree of cross-linking and may have different properties, but they are all very resistant to alkalies.

Before being reacted with the polyisocyanates, the reduced co-polymers may be subjected to partial esterification with monocarboxylic or dicarboxylic acids; when the esterification is carried out with dicarboxylic acids the co-polymers increase in molecular weight. The quantity of the mono- or di-carboxylic acid should be less than the amount calculated on the hydroxyl groups, prior to the reaction with the polyisocyanates.

Examples of hydroxyl-group-containing conversion products of the polymers, other than the polyalcohols obtained by the reduction of the polymers, which may be reacted with the polyisocyanates are the methylol compounds obtainable by reacting the polyketones with formaldehyde, or by partially reducing the co-polymers and then reacting them with formaldehyde.

Polyisocyanates suitable for use in the process of the invention are aliphatic, hydroaromatic, and aromatic di- and tri-isocyanates, and isocyanates prepared by reacting polyalcohols with polyglycol ethers, or by reacting hydroxyl-group-containing polyesters with a quantity of a diisocyanate in excess of the amount required to react with the hydroxyl groups. Instead of free polyisocyanates, compounds splitting off isocyanates on heating, for instance phenyl urethanes, or the reaction products of polyisocyanates and malonic or acetoacetic ester may be used.

The hydroxyl-group-containing co-polymers, preferably in solution in a solvent containing no hydroxyl groups, are intimately mixed with the polyisocyanates prior to moulding and then applied in the usual manner to give a lacquer or varnish coating or an impregnation or bonding or cementing layer.

If compounds splitting off isocyanates are used, the reaction may alternatively be carried out in a solvent containing hydroxyl groups.

The plastics obtained by the process of the invention can be hardened at room temperature or a higher temperature; the reaction is considerably accelerated when carried out in the presence of tertiary amines.

The viscosity of the reaction solution can be increased from the very beginning by pre-treating the solution of the polyhydroxy compound with an amount of a polyisocyanate insufficient to cause cross-linking and adding a further quantity of the cross-linking component shortly before a final molding operation.

In general, the ratio of the polyhydroxy compound to the polyisocyanate is so chosen that the products obtained contain one OH-group per one NCO-group. It is sometimes preferable to use a deficient quantity of the polyisocyanate; the cross-linked polyurethanes thus produced contain free hydroxyl groups.

In many cases the properties of the plastics obtained by the process of the invention may be improved by blending them with suitable additives, for instance fillers, plasticizers, and other polyhydroxy compounds.

The invention is further illustrated by the following examples without, however, being restricted thereto; the parts are by weight.

*Example 1*

120 parts of a co-polymer obtained from ethylene and carbon monoxide, which contains 35% of carbon monoxide and has an average molecular weight of 1150, are dissolved in 750 parts of dioxane and hydrogenated, 20 parts of Raney nickel being used as catalyst, at 300 atmospheres (hydrogen pressure) and 150° C. for 2½ hours. After separating the catalyst the solvent is removed in vacuo. 110 parts of a viscous residue containing 3.7% of hydroxyl groups are obtained.

100 parts of a 50% acetone solution of the above hydrogenation product are mixed with 9.5 parts of toluylene diisocyanate and applied to substrates of paper, wood, glass and sheet metal by brushing or spraying. After standing at room temperature for several hours or, when the substrates are of refractory material, after baking at 160–180° C. for 30–60 minutes, strongly adhering coatings with hard surfaces, which are very stable to sodium hydroxide solution, are obtained.

When the 9.5 parts of toluylene diisocyanate in the above reaction are replaced by 33 parts of a 75% ethyl acetate solution of a polyisocyanate obtained by the condensation of 1 mol of trimethylol propane and 3 mols of toluylene diisocyanate, films of still greater surface hardness are obtained, the other properties remaining unchanged.

*Example 2*

100 parts of a co-polymer obtained from propylene, ethylene and carbon monoxide, which contains 27.4% of carbon monoxide and has an average molecular weight of 1550, are dissolved in dioxane, hydrogenated with 30 parts of Raney cobalt and worked up as described in Example 1. 95 parts of a highly viscous product containing 6.2% hydroxyl groups are obtained.

100 parts of a 50% acetone solution of this product are mixed with 14 parts of toluylene diisocyanate and applied to substrates of various materials as a lacquer solution. Very brilliant lacquer coatings which are very stable to chemical and alkali metal hydroxide solutions are obtained after standing for several hours, or after baking, as described in Example 1.

When the toluylene diisocyanate is replaced by 50 parts of the 75% ethyl acetate solution of the polyisocyanate obtained from 3 mols of toluylene diisocyanate and 1 mol of trimethylol propane, a lacquer solution results which forms films stable to saponifying agents and is highly suitable for the cold or hot cementing of a wide range of materials.

*Example 3*

850 parts of a co-polymer obtained from propylene, ethylene and carbon monoxide, which contains 31% of carbon monoxide and has an average molecular weight of 2100, are dissolved in 2000 parts of ethyl acetate and hydrogenated with 100 parts of Raney nickel at 250 atmospheres (hydrogen pressure) at 150° C. for 6 hours. After separating the catalyst the solvent is removed. 800 parts of a light yellow soft resin containing 5.3% of hydroxyl groups result. The resin yields true solutions in benzene, acetone, ethyl acetate, butyl acetate and methyl glycol acetate.

128 parts of a 50% solution of the thus obtained polyalcohol in a mixture of ethyl acetate and butyl acetate (1:1) are mixed with 17 parts of hexamethylene diisocyanate and applied to textiles of the most different kind by the immersion process. After drying at 100–160° C. valuable impregnations are obtained within a short time, which are highly resistant to alkali and other chemical influences.

*Example 4*

100 parts of the soft resin described in Example 3, which contains 5.3% of hydroxyl groups, are dissolved together with 100 parts of a polyester containing 7.0% of hydroxyl groups, which polyester is derived from 3 mols of adipic acid, 2 mols of 1.3-butylene glycol and 2 mols of trimethylol propane, in a solvent mixture of 100 parts of ethyl acetate and 100 parts of methyl glycol acetate, and mixed with 71 parts of toluylene diisocyanate. After drying in the air or baking at 180° C. for 15 minutes, this lacquer solution yields coatings of high brilliancy, which strongly adhere to the most different substrates. The coatings thus produced are distinguished by an essentially higher stability to alkalies as compared with films produced only from the above polyester and toluylene diisocyanate.

*Example 5*

680 parts of a co-polymer obtained from propylene, ethylene and carbon monoxide, which contains 30.6% of carbon monoxide and has an average molecular weight of 2200, are reduced with 220 parts of aluminum isopropylate in 1575 parts of isopropanol according to Meerwein-Ponndorf. Upon heating at a temperature of 56–82° C., 2000 parts of a mixture of acetone and isopropanol are distilled off within 13 hours. After removing 750 parts of isopropanol by distillation the reaction mixture is decomposed with 150 parts of concentrated sulfuric acid in 200 parts of water by stirring at 80° C. for 30 minutes. The acid, aqueous layer is removed, the reduction product taken up in ethyl acetate and dried over potassium carbonate. After evaporating the solvent 615 parts of a viscous clear resin containing 4.7% of hydroxyl groups are obtained. The resin dissolves in acetone, ethyl acetate, butyl acetate, methyl glycol acetate and benzene in every proportion.

145 parts of a 50% solution of this reduction product in butyl acetate are intimately mixed with 68 parts of the 75% ethyl acetate solution of a polyisocyanate obtained by reacting 3 mols of toluylene diisocyanate and 1 mol of trimethylol propane. This clear solution yields, at room temperature or baking temperatures, films, impregnations or adhesives with properties equal to those of the reaction products of Examples 1 and 2.

*Example 6*

100 parts of a co-polymer obtained from ethylene, propylene and carbon monoxide, which contains 30% of carbon monoxide and has an average molecular weight of 210, are dissolved in 300 parts of dioxane and heated to 110° C. for 5 hours with 50 parts of paraformaldehyde and 2 parts of potassium carbonate in an autoclave provided with a stirrer. The slightly turbid solution is filtered and evaporated to 240 parts. The dioxane solution contains then 57% of the methylol compound (which contains 7.75% of hydroxyl groups) of the polyketone employed.

2.8 parts of a 50% ethyl acetate solution of toluylene diisocyanate are added to 100 parts of the above solution and the lacquer solution thus obtained is applied to articles of any desired kind. An insoluble clear lacquer coating results after a short time.

*Example 7*

100 parts of a partially hydrogenated co-polymer obtained from ethylene, propylene and carbon monoxide, which contains 1.8% of hydroxyl groups, are reacted as described in the preceding example by heating with paraformaldehyde in dioxane solution in the presence of potassium carbonate. After evaporating to 250 parts the dioxane solution contains 53% of the methylol compound which contains 7.82% of hydroxyl groups. 100 parts of this solution are mixed with stirring with the solution of 22 parts of toluylene diisocyanate in 30 parts of methyl glycol ether acetate. The clear lacquer solution is suitable for coating wood, cardboard and metals of all kinds. The coatings produced at room or higher temperatures are extremely stable to aqueous alkalies.

*Example 8*

200 parts of a partially hydrogenated co-polymer derived from ethylene, propylene and carbon monoxide, which contains 4.7% of hydroxyl groups, are heated at 150° C. for 5 hours with 15 parts of propionic anhydride with stirring. After heating in the vacuum of a water jet pump for another 3 hours at the same temperature the proportion of the hydroxyl groups is reduced to 2.5% and the reaction product has the acid number 0.1.

125 parts of this esterification product are dissolved in 125 parts of ethyl acetate and mixed with 100 parts of the 45% ethyl acetate solution of the polyisocyanate prepared from 3 mols of toluene diisocyanate and 1 mol of trimethylol propane.

After drying in the air for a short time and baking at 120° C. for 1 hour this lacquer solution yields coatings of high brilliancy which strongly adhere to the most different substrates and possess a particularly good stability to alkalies and other chemical influences.

*Example 9*

100 parts of a hydrogenated co-polymer obtained from ethylene, propylene and carbon monoxide, which contains 4.7% of hydroxyl groups, are heated with 4 parts of maleic anhydride at 140° C. for 1 hour with stirring. After cooling a viscous yellow resin results. 50 parts of this partially esterified resin are dissolved in 50 parts of ethyl acetate and mixed with 66 parts of a 45% ethyl acetate solution of the polyisocyanate prepared from 3 mols of toluylene diisocyanate and 1 mol of trimethylol propane. At room temperature or baking temperatures the clear solution yields films, coatings or adhesives which, apart from good hardness and adhesiveness, have increased stability to chemicals, especially alkalies and acids.

We claim:

1. A lacquer comprising a mixture of (1) an organic polyisocyanate, (2) a member selected from the group consisting of (a) a product obtained by reducing carbonyl groups of an ethylene-propylene-carbon monoxide copolymer to secondary hydroxyl groups and (b) a product obtained by reacting an ethylene-propylene-carbon monoxide copolymer with formaldehyde to introduce methylol groups, and (3) an organic solvent.

2. A lacquer comprising a mixture of (1) an organic polyisocyanate, (2) a product obtained by reducing carbonyl groups of an ethylene-propylene-carbon monoxide copolymer to secondary hydroxyl groups followed by the partial esterification of said hydroxyl groups, and (3) an organic solvent.

3. A lacquer comprising a mixture of (1) an organic polyisocyanate, (2) a product obtained by partially reducing the carbonyl groups of an ethylene-propylene-carbon monoxide copolymer to secondary hydroxyl groups followed by reacting the reduced copolymer with formaldehyde to introduce methylol groups, and (3) an organic solvent.

4. A lacquer comprising a mixture of an organic polyisocyanate, a product obtained by reducing carbonyl groups of an ethylene-propylene-carbon monoxide copolymer to secondary hydroxyl groups, and an organic solvent.

5. A lacquer comprising a mixture of an organic polyisocyanate, a product obtained by reacting an ethylene-propylene-carbon monoxide copolymer with para-formaldehyde to introduce methylol groups therein, and an organic solvent.

6. A lacquer comprising a mixture of an organic polyisocyanate, a product obtained by reacting a partially hydrogenated copolymer of ethylene, propylene and carbon monoxide with para-formaldehyde to introduce methylol groups therein, and an organic solvent.

7. A lacquer comprising a mixture of an organic polyisocyanate, a product obtained by reducing carbonyl groups of an ethylene-propylene-carbon monoxide copolymer to secondary hydroxyl groups followed by partial esterification of said hydroxyl groups with propionic anhydride, and an organic solvent.

8. A lacquer comprising a mixture of an organic polyisocyanate, a product obtained by reducing carbonyl groups of an ethylene-propylene-carbon monoxide copolymer to secondary hydroxyl groups followed by partial esterification of said hydroxyl groups with maleic anhydride, and an organic solvent.

References Cited in the file of this patent

UNITED STATES PATENTS

| | | |
|---|---|---|
| 2,277,083 | Dorough | Mar. 24, 1942 |
| 2,386,347 | Roland | Oct. 9, 1945 |
| 2,468,713 | Kropa | Apr. 26, 1949 |
| 2,495,292 | Scott | Jan. 24, 1950 |

UNITED STATES PATENT OFFICE
CERTIFICATE OF CORRECTION

Patent No. 2,904,532                                                                    September 15, 1959

Hugo Wilms et al.

It is hereby certified that error appears in the printed specification of the above numbered patent requiring correction and that the said Letters Patent should read as corrected below.

In the grant, lines 3, 4, and 5, for "assignors, by mesne assignments, to Mobay Chemical Company, of Pittsburgh, Pennsylvania, a corporation of Delaware," read -- assignors, by direct and mesne assignments, of one-half to Farbenfabriken Bayer Aktiengesellschaft, of Leverkusen, Germany, a corporation of Germany, and one-half to Mobay Chemical Company, of Pittsburgh, Pennsylvania, a corporation of Delaware, --; line 14, for "Mobay Chemical Company, its successors" read -- Farbenfabriken Bayer Aktiengesellschaft and Mobay Chemical Company, their successors --; in the heading to the printed specification, lines 5, 6, and 7, for "assignors, by mesne assignments, to Mobay Chemical Company, Pittsburgh, Pa., a corporation of Delaware" read -- assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware --.

Signed and sealed this 26th day of April 1960.

(SEAL)
Attest:

KARL H. AXLINE                                              ROBERT C. WATSON
Attesting Officer                                     Commissioner of Patents